(12) United States Patent
Atkinson et al.

(10) Patent No.: US 6,378,384 B1
(45) Date of Patent: Apr. 30, 2002

(54) FORCE SENSING TRANSDUCER AND APPARATUS

(75) Inventors: John Karl Atkinson, Sherfield English; Andrew William James Cranny; Russell Paul Sion, both of Southampton, all of (GB)

(73) Assignee: C-Cubed Limited (GB)

(*) Notice: Subject to any disclaimer, the term of this patent is extended or adjusted under 35 U.S.C. 154(b) by 0 days.

(21) Appl. No.: 09/366,875

(22) Filed: Aug. 4, 1999

(51) Int. Cl.⁷ .............................. G01L 1/10; G01L 1/22
(52) U.S. Cl. ............................ 73/862.625; 73/862.627; 73/862.474
(58) Field of Search ................ 73/763, 767, 772, 73/795, 811, 862.473, 862.474, 862.622, 862.625, 862.627, 862.628, 862.637, 862.68, 768, 774, 777

(56) References Cited

U.S. PATENT DOCUMENTS

| 4,106,370 A | | 8/1978 | Kraus et al. ................ 73/88 |
| 4,348,908 A | * | 9/1982 | Shoh ....................... 73/862.68 |
| 4,355,202 A | | 10/1982 | DeCosta et al. ............. 178/18 |
| 5,222,399 A | * | 6/1993 | Kropp ..................... 73/862.68 |
| 5,365,799 A | * | 11/1994 | Okada ..................... 73/862.68 |
| 5,578,766 A | * | 11/1996 | Kondo ..................... 73/862.68 |

FOREIGN PATENT DOCUMENTS

| EP | 0 140 66 A1 | | 5/1985 | |
| GB | 1472294 | * | 1/1974 | ............ G01L/1/18 |
| GB | 1472294 | | 5/1977 | |
| GB | 8622354 | | 10/1986 | |
| GB | 8627462 | | 12/1986 | |
| GB | 8704380 | | 4/1987 | |
| GB | 2187887 | * | 9/1987 | ........... H01L/23/00 |
| GB | 9603387 A | | 4/1996 | |
| GB | 2310288 | * | 8/1997 | ............ G01L/5/24 |
| WO | PCTUS9501480 | | 1/1995 | |

* cited by examiner

Primary Examiner—Benjamin R. Fuller
Assistant Examiner—Maurice Stevens
(74) Attorney, Agent, or Firm—Sheridan Ross P.C.

(57) ABSTRACT

A transducer which enables the force experienced by a simple force sensor to be converted into an electrical signal which is then capable of being used as a measure of the degree of force experienced by an object to which the sensor is attached. Preferably force sensitive resistors fabricated as thick film resistors which are printed and then fired onto an electrically insulated substrate material which by its construction are used to form a force sensing device and the force is applied to the force sensitive resistors via a force transmitting member which is shaped to only apply force to the force sensitive resistors and not to fixed value resistors which are co-located on the force sensing device. In this way the force sensitive resistors and the fixed value resistors can be interconnected to give an optimum configuration of electrical measurement circuit such as a Wheatstone's bridge circuit.

12 Claims, 4 Drawing Sheets

FORCE SENSING TRANSDUCER AND APPARATUS

TECHNICAL FIELD

The invention relates to a transducer and apparatus which enables the force experienced by a simple force sensor to be converted into an electrical signal which is then capable of being used as a measure of the degree of force experienced by an object to which the sensor is attached. For example the invention may be used to realized a force sensitive washer which can be mounted between a retaining nut and an internal combustion engine cylinder head block in such a manner as to enable the pressure pulses caused by the engine to be detected and/or measured.

BACKGROUND OF THE INVENTION

The electrical measurement of force is particularly useful in applications where for example, it is desirable to implement some degree of control over a process or operation that produces the force. One such example is an internal combustion engine in which the measurement of the force experienced at particular locations on the engine block or cylinder head, for example, can be used to determine the pressures exerted by the engine's firing or combustion cycle. The exact timing of the point of maximum pressure is particularly useful information and can be gainfully employed in an engine management system such as might be realized by a controlling microcomputer. Hence a continuous electrical signal which is proportional to the engine pressures at all times is of particular use since this signal enables the precise timings of the various levels of engine pressure (and therefore engine cycle) to be accurately measured.

Force measurement is also useful in the control of fuel for internal combustion engines. In such engines, the air/fuel mixture ratios are precisely controlled in order to obtain optimum performance. Very often this strategy results in unwanted side effects such as the occurrence of engine-knock. A sensor capable of obtaining data representative of engine pressures can be used in this context to enable the early detection of the onset of engine-knock and hence facilitate the so-called "lean burn" mode of operation of the engine that is popular among engine manufacturers.

Techniques for the electrical measurement of force, particularly with regard to load sensing are known. For example, methods for measuring force utilizing piezoelectric materials such as quartz or lead zirconium titanate are well established. Another popular technique for measuring force involves using the piezoresistive effect exhibited by certain materials and the use of electrical resistance strain gauges in this context is known.

Of the piezoelectric devices, most of the devices employed in the prior art are expensive due to the need for complex manufacture to render them suitable for mechanical mounting. In addition the associated electrical circuits needed to measure their output signal, which takes the form of released charge, are also complex and expensive. Further disadvantages of the use of piezoelectric devices are their poor response at low frequencies and their high susceptibility to the unwanted effects of temperature variations.

Piezoresistive devices generally use comparatively inexpensive electrical circuits to measure the changes in resistance which result from the strain experienced due to applied force. A major problem in many applications, however, is the difficulty of mounting resistive strain gauges in a suitable mechanical arrangement. This latter consideration stems from the fact that it is often impossible to locate a resistive strain gauge at a point where it will experience sufficient strain to enable an accurate measurement to be made. Also the use of adhesives which is often necessary in the mounting of resistive strain gauges, makes them particularly susceptible to the problem of creep between the gauge and the supporting structure. In particular, metal foil resistive strain gauges, which are popular sensing elements in commercial force sensors, suffer from a relatively low sensitivity.

The characteristics of piezoresistive devices used in the measurement of force can be significantly improved if the force sensing elements are fabricated as thick film resistors. As described, for example in GB-A-2310288, it is possible to print force-sensing resistors onto an electrically insulating substrate and then sandwich them between this substrate and an electrically insulating material in such a way as to form a force sensing washer. By measuring the change in resistance of the force sensing resistors it is then possible to determine the degree of force applied to the washer.

SUMMARY OF THE INVENTION

According to the invention a force sensing transducer comprises; an electrically insulative support substrate, a force sensitive resistance comprising a thick film resistor formed as a plurality of overlapped layers of thick film material printed and fired onto the support substrate, a reference resistance located on the support substrate, and a force transmitting member overlying the force sensitive resistance and arranged to transmit force to the force sensitive resistance and not to the reference resistance, whereby the change in resistance of the force sensitive resistance relative to the reference resistance is indicative of the magnitude of a force applied between the support substrate and the force transmitting member.

In order to measure the change in resistance of the force sensitive resistors it is desirable to connect them to an electrical circuit such as a Wheatstone's bridge for example. In this arrangement the change in resistance of the force sensitive resistors (used for force sensing) relative to fixed value (reference) resistors included in the bridge results in an out-of-balance condition in the bridge which produces an output voltage change proportional to the degree of applied force.

The choice of the fixed value resistors largely determines the characteristics of the resulting force sensor. For example, a sensor with good thermal stability can be achieved if the fixed value resistors and the force sensing resistors share the same temperature characteristic and are subjected to the same thermal excursions. This can be achieved if the fixed value resistors are fabricated identically to the force sensing resistors and are located on the same substrate material but at a point of constant force regardless of the degree of force applied to the force sensing resistors.

Similarly, for a full Wheatstone's bridge configuration the optimum output signal change for any given applied force will be obtained when the resistance values of the fixed resistors are identical to the resistance values of the force sensing resistors with zero applied force. This condition can be conveniently achieved when for example, the force sensing resistors and the fixed value resistors are simultaneously fabricated as thick film resistors. In this way, both types of resistor can be simultaneously printed with the same thick film material and to a common geometry and, in particular, thickness.

The present invention also makes it possible to fabricate a force sensitive device in which the fixed value resistors and the force sensitive resistors are co-located onto a common substrate such that the force sensitive resistors are subjected to the applied force whilst the fixed value resistors are not. In this way it becomes possible to fabricate both the force sensing and fixed value resistors as matched devices sharing the same thermal environment

BRIEF DESCRIPTION OF THE FIGURES

The invention will now be described by way of example, with reference to the drawings in which.

When a force sensitive resistor is subjected to an applied force, its resistance will change due to the changes in geometry experienced and any piezoresistive effects on the resistivity of the material comprising the resistor.

The relationship between the strain experienced ($\epsilon$) and the change in resistance ($\delta R$) of an electrical resistor of resistance R ohms, when the strain is applied in the same plane as the electrical current flow through the resistor, is given by the following equation:

$$\delta R/R = \epsilon(1+2\nu) + \delta\rho/\rho \quad \text{\{Equation 1\}}$$

Where $\nu$ is Poisson's ratio for the material comprising the planar electrical resistor and $\delta\rho/\rho$ is the unit change in the resistivity of the material comprising the resistor due to the piezoresistive effect.

A preferred embodiment of the sensor described below includes the force sensitive resistors formed from a thick film resistor paste. This confers several advantages including a strain sensitivity higher than that of most commercially available resistive strain gauges due to a higher value for the $\delta\rho/\rho$ term shown in Equation 1. Additionally it is possible to fabricate the sensor in such a way as to produce very small surface areas for the electrical resistors onto which the applied force can then be concentrated. This in turn concentrates the stress due to the applied force, and consequently the strain experienced by the force-sensing resistor for any given modulus of elasticity.

In another preferred embodiment of the invention, the force sensitive resistors. are printed onto an electrically insulating substrate simultaneously with fixed value resistors in an interconnected arrangement that forms a Wheatstone's bridge for example, or some other suitable measurement circuit.

Figure 1:
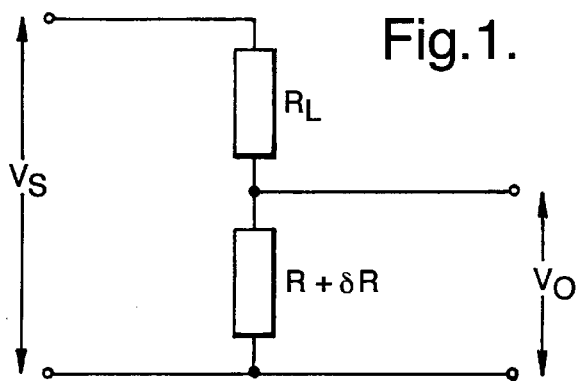
FIG. 1 is a schematic circuit diagram of a force sensitive resistor coupled in series with a reference resistor.

As previously mentioned, the optimum thermal characteristics and output signal change from a Wheatstone's bridge arrangement of force sensitive resistors and fixed value resistors are obtained when the resistance value of the unstrained force sensitive resistors is equal to the resistance value of the fixed value resistors. This can be explained with reference to FIG. 1 where an electrical connection of a force sensitive resistor R and a fixed value resistor $R_L$ is shown.

If an applied force produces a small change $\delta R$ in the resistance of the force sensitive resistor R, then for an applied voltage $V_s$ the output voltage $V_o$ will experience a small change $\delta V_o$ as determined by the following expression:

$$\frac{\delta V_o}{V_s} = \frac{\delta R}{R_L + \frac{R^2}{R_L} + 2R} \quad \text{\{Equation 2\}}$$

Setting $$X = \frac{R_L}{R},$$

this expression can be re-written as follows:

$$\frac{\delta V_o}{V_s} = \frac{\delta R}{R} \times \frac{1}{X + \frac{1}{X} + 2} \quad \text{\{Equation 3\}}$$

Which is maximised when the function $$f(X) = X + \frac{1}{X} + 2 \quad \text{\{Equation 4\}}$$

is at a minimum value.

Differentiating equation 4 with respect to X and setting equal to zero gives:

$$1 - \frac{1}{X^2} = 0 \quad \text{\{Equation 5\}}$$

Which is true when X=1 and hence $R_L$=R.

Differentiating equation 5 with respect to X gives $$\frac{2}{X^3}$$

which for X=1 is positive hence showing that the function shown in equation 4 is in fact minimized when $R_L$=R.

Hence the output signal, as defined in equation 2, is maximised when $R_L$=R and the change in the output voltage is given by:

$$\frac{\delta V_o}{V_s} = \frac{\delta R}{4R} \quad \{\text{Equation 6}\}$$

Figure 3:
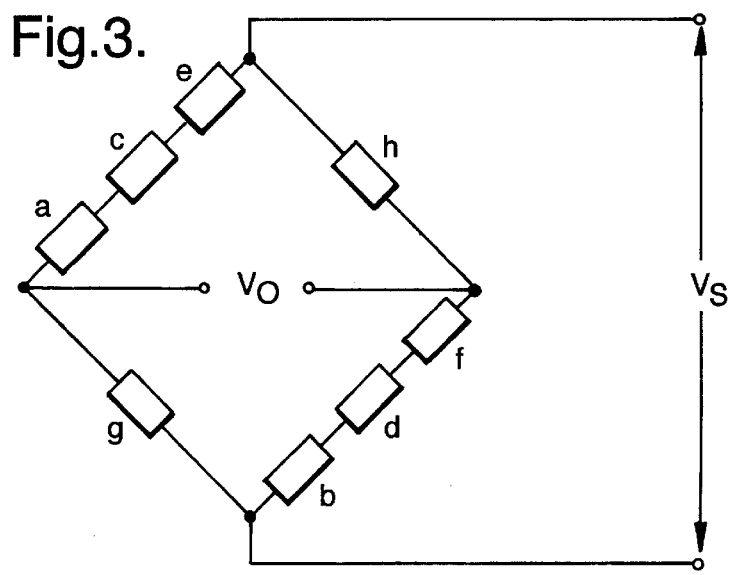
FIG. 3 is a schematic circuit diagram of a Wheatstone's bridge.
Figure 2A:
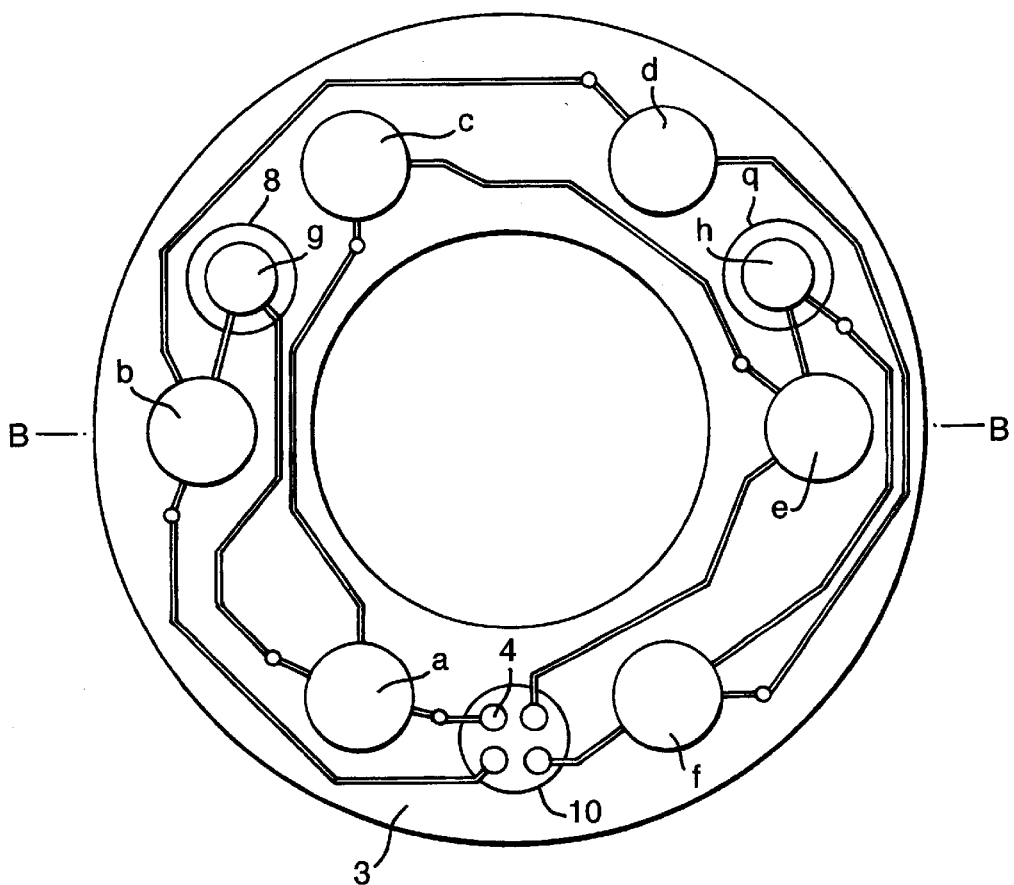
FIG. 2A is a schematic plan view of a force transducer in accordance with the invention.
Figure 2B:
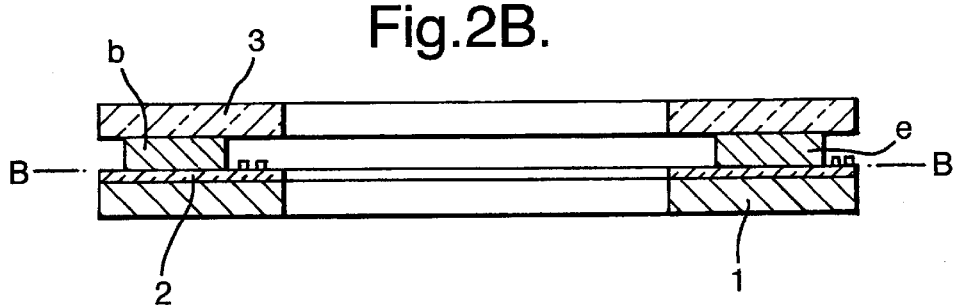
FIG. 2B is a schematic cross-sectional view along the line B—B of FIG. 2A.

FIG. 2 shows a plan view and a cross-section along the line BB of an embodiment of this invention in which the electrically insulated substrate consists of a steel washer 1 onto which is printed and fired an electrically insulating layer of glass ceramic 2. A series of force sensitive resistors a, b, c, d, e, and f are printed onto the surface of the electrically insulated washer and interconnected electrically to form the Wheatstone's bridge as indicated schematically in FIG. 3. In this particular example six separate force sensitive resistors are shown although other numbers may be used. Fixed value resistors g and h are also shown printed onto the electrically insulated washer to complete the Wheatstone's bridge. Again for the purposes of this example only two fixed value resistors are shown although other numbers may be used.

As previously explained, a preferred embodiment of the invention is one in which the fixed value resistors have the same value of electrical resistance as the force sensitive resistors connected in series when no force is applied to them. This then results in the arms of the Wheatstone's bridge having equal values of electrical resistance and the bridge being balanced giving zero output signal for zero applied force. In the embodiment illustrated in FIG. 2 this is achieved by suitable design of the relative geometries of the fixed value resistors and the force sensitive resistors.

In this embodiment, an electrically insulating washer 3, made from a ceramic or a metal coated with an electrically insulating layer of glass ceramic or other suitable material, can be placed in contact with the washer carrying the force sensitive resistors and fixed value resistors in order to act as a force transmitting component to form a force sensitive device.

Figure 4A:
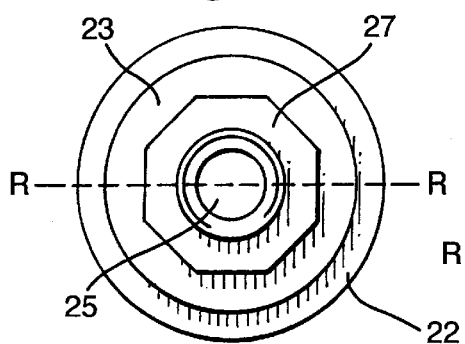
FIG. 4A is a schematic plan view of a mounting arrangement for a force transducer in accordance with the invention.
Figure 4B:
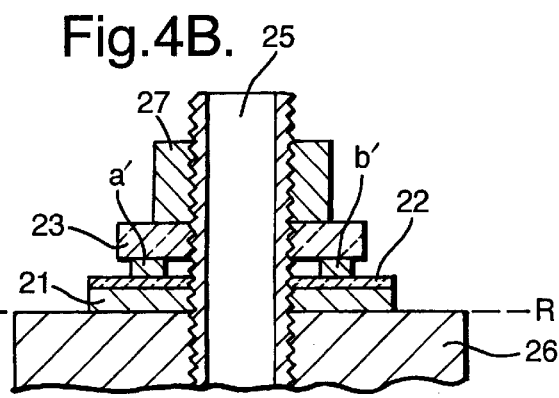
FIG. 4B is a schematic cross-sectional view along the line R—R of FIG. 4A.

FIG. 4 shows a plan view, and a cross-section along the line RR, of a typical mounting arrangement for one embodiment of the force sensor here described. An electrically insulating washer consisting of a steel washer 21 onto which is printed and fired an electrically insulating layer of glass ceramic 22 which serves as a supporting substrate for the force sensitive resistors a' and b'. In the illustration of FIG. 4, the washer is shown mounted over a securing stud 25, which might be screwed into an engine block 26 for example. An electrically insulating force transmitting component 23, in the shape of a washer for example, is secured in contact with the force sensitive resistors by a retaining nut 27.

With the arrangement here described, any forces experienced by the retaining nut, due to pressure pulses in the engine block for example, will result in a force being experienced by the force sensitive resistors mounted on the washer. This force will result in a change in the resistance of the force sensitive resistors which can then be measured using a suitable electrical circuit such as the Wheatstone's bridge for example.

Preferably, the electrically insulated force transmitting component is shaped in such a way as to allow the applied force to be transmitted to the force sensitive resistors but not to the fixed value resistors. This can be achieved by forming the force transmitting component with cut away portions which overlay the fixed valued resistors on the force sensitive washer, for example as shown in FIG. 2, where the cut away portions are realized as holes 8 and 9 directly above the fixed value resistors g and h.

Figure 5:
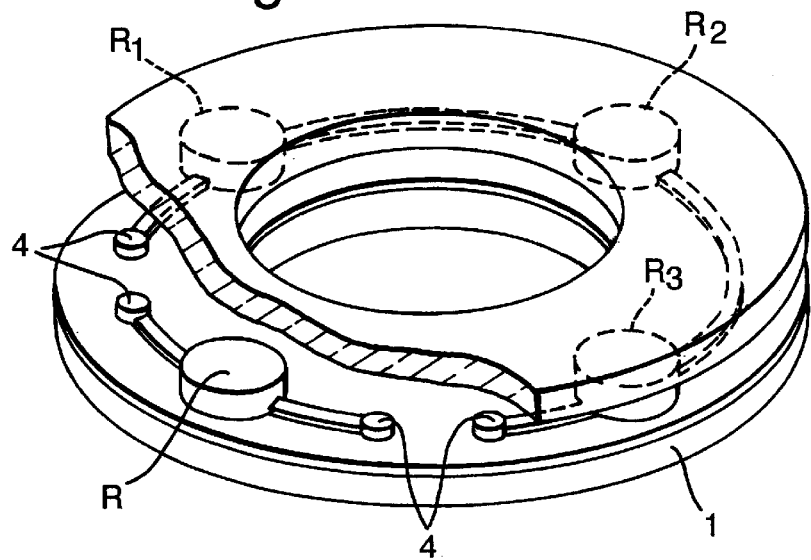
FIG. 5 is a schematic view of a force transducer having a cut away force transmitting member.
Figure 6:
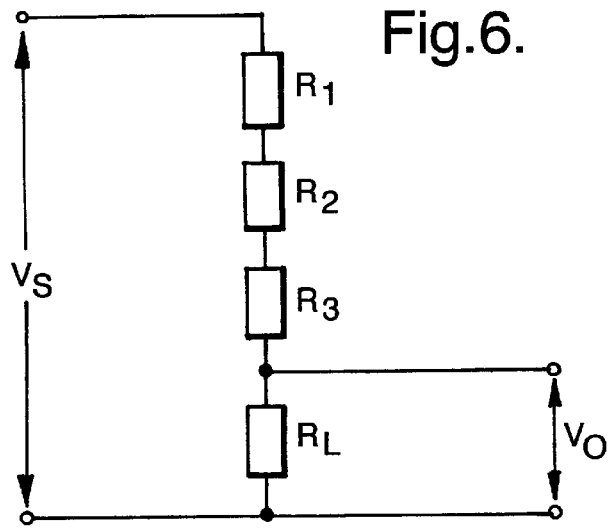
FIG. 6 is a schematic circuit diagram showing interconnections between force sensitive resistors and a reference resistor.

Another example is illustrated in FIG. 5 in which a chord is cut away from the force transmitting component 3 such that a fixed value resistor $R_L$ can be located on the force sensing washer 1 under the cut away portion so that no force is applied to the fixed value resistor by the force transmitting component. In this example force sensitive resistors $R_1$ $R_2$ and $R_3$ are shown in dashed outline beneath the force transmitting component 3. The force sensitive resistors and the fixed value resistor can be interconnected via the solder connection pads 4 to give the circuit configuration shown in FIG. 6 for example.

A further advantage of the use of cut away portions in the force transmitting component is that it facilitates the making of electrical connections to the force sensing and fixed value resistors by the soldering of wires for example. This is illustrated in FIG. 2 in which a circular cut away section 10 in the force transmitting component 3 is shown located above the solder connection pads 4. In this way interconnecting wires can be soldered or otherwise connected to the connection points without encumbrance from the force-transmitting component which might otherwise mechanically or electrically impede the wires.

It is advantageous to place the force sensitive resistors approximately equidistant around the circumference of a washer, such as the arrangement shown in FIG. 2 for example, so that approximately equal strains are experienced in the resistors due to the approximately equal distribution of any applied force when the washer is subjected to force. This arrangement has a tendency to decrease any errors arising from load eccentricity.

The force sensitive resistors, such as the arrangements illustrated in FIGS. 2 and 4 for example, may be electrically connected in series. Such an arrangement further decreases any errors arising from load eccentricity. In such an embodiment, changes in the combined resistance of the force sensitive resistors will indicate the total strain that is experienced by the resistors regardless of how it is distributed between the individual devices. Thus if there is any tendency for the stud and washer assembly to rock sideways, any imbalance in the components of strain so produced are averaged out by the mounting and electrical interconnection arrangement of the force sensitive devices. In a situation where it is not feasible to interconnect the force sensitive resistors in this way it is possible to measure the resistance changes of individual resistors or several groups of resistors and then sum and/or average them mathematically to achieve the same effect.

The force applied and the electrical current flowing through the force sensitive resistors may be arranged to be both normal to the plane of the supporting substrate. This mode of operation results in an optimum level of sensitivity due to the fact that the piezoresistive coefficient, and hence sensitivity, is maximised in this configuration whilst the effect of any temperature coefficient of expansion mismatch between the substrate and the materials comprising the force sensing resistor is minimized.

Figure 7A:
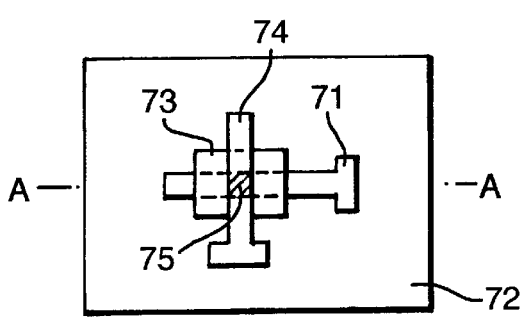
FIG. 7A is a schematic plan view of an alternative force transducer in accordance with the invention.
Figure 7B:
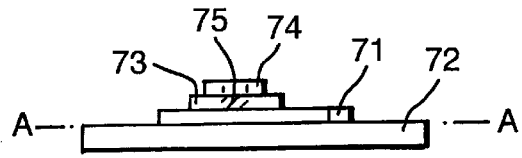
FIG. 7B is a schematic cross-sectional view along line A—A of FIG. 7A.

FIG. 7 shows a typical embodiment of a piezoresistive force sensor where a highly conductive layer of material 71 is deposited onto a suitable insulating substrate 72. A resistive material 73 is then deposited on top of the bottom layer conductor 71 and a further layer of high conductivity material 74 is deposited on top of the resistive material 73. The conducting layers 71 and 74 may be deposits of a suitably processed thick film paste containing a conductive material such as gold, although other materials may be used. A suitable supporting insulating substrate 72 may be made of aluminium oxide although other materials may also be used including metal onto which has been deposited an electrically insulating layer. The resistive layer 73 may be a suitably processed thick film resistor paste or other strain sensitive material.

The cross-section along the line AA in FIG. 7 shows the overlapping nature of the layers which are arranged so as to leave an area of resistive material sandwiched between the two conducting layers. This area of overlap 75 (shown hatched in FIG. 7) can be designed to be as large or as small as is necessary for the particular application for which it is intended. This is in order to define precisely the amount of stress, and hence strain, experienced by the resistor for any given applied force such as to optimize device sensitivity.

Figure 8:
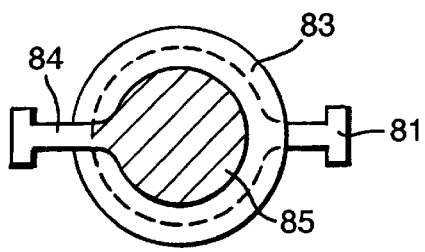
FIG. 8 is a schematic plan view of a further alternative force transducer in accordance with the invention.

FIG. 8 shows a further embodiment in which the geometry of the overlapping layers is arranged to be circular in order to minimize excessive localised stress concentrations which may occur with rectangular geometries for example. The embodiment illustrated in FIG. 8 shows a plan view of a circular arrangement of a bottom conducting layer 81 onto which the resistive layer 83 and a top conducting layer 84 have been deposited so as to form an area of overlap 85 (shown hatched in FIG. 8) which forms the active area of the sensor. Other stress concentration avoiding geometries are possible such as geometries in which square corners or sharp changes in direction of the boundaes of the patterns defining the active area of the sensor are avoided.

Figure 9:
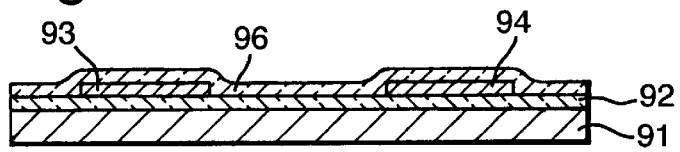
FIG. 9 is a schematic cross-sectional view of a force transducer covered with an electrically insulative layer.

A further embodiment of the invention is illustrated in FIG. 9 in which the force sensitive resistors 93, 94 are fabricated onto a supporting substrate 91. The supporting substrate 91 may be constructed from an electrically insulating material or from a non-electrically insulating material, such as a metal, covered with an electrically insulating material 92. In this embodiment the force sensitive resistors 93, 94 are covered with a layer of electrically insulating material 96 such as glass ceramic for example. This arrangement then obviates the need for an electrically insulating force transmitting component and the force to be sensed can be applied to the force sensing devices using a force transmitting component made from any suitable material regardless of its electrical conductivity, such as a metal for example.

Figure 10:
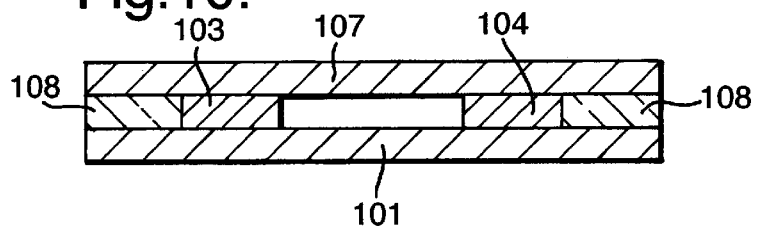
FIG. 10 is a schematic cross-sectional view of a force transducer in accordance with the invention having a force transmitting member bonded to the transducer.

An additional embodiment of the invention is illustrated in FIG. 10 where a force transmitting component 107 is bonded to a force sensing device comprising a supporting substrate 101 and force sensitive resistors 103, 104 using a bonding material 108 such as a room temperature vulcanizing compound or some other suitable material for example. Preferably, the bonding material possesses a low modulus of elasticity compared with that of the force sensitive resistors. This arrangement has the advantage of resulting in a one-piece assembly for the force sensing device and the electrically insulating force transmitting component as well as helping to maintain a repeatable mechanical positioning of the two components during handling. If this embodiment is used with a force sensing device in which an electrically insulating layer has been deposited onto the force sensitive resistors, then the force transmitting component itself does not need to be electrically insulating.

Figure 11:
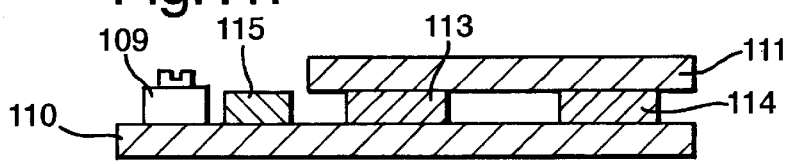
FIG. 11 is a schematic cross-sectional view of a force transducer including a compensating component.
Figure 12:
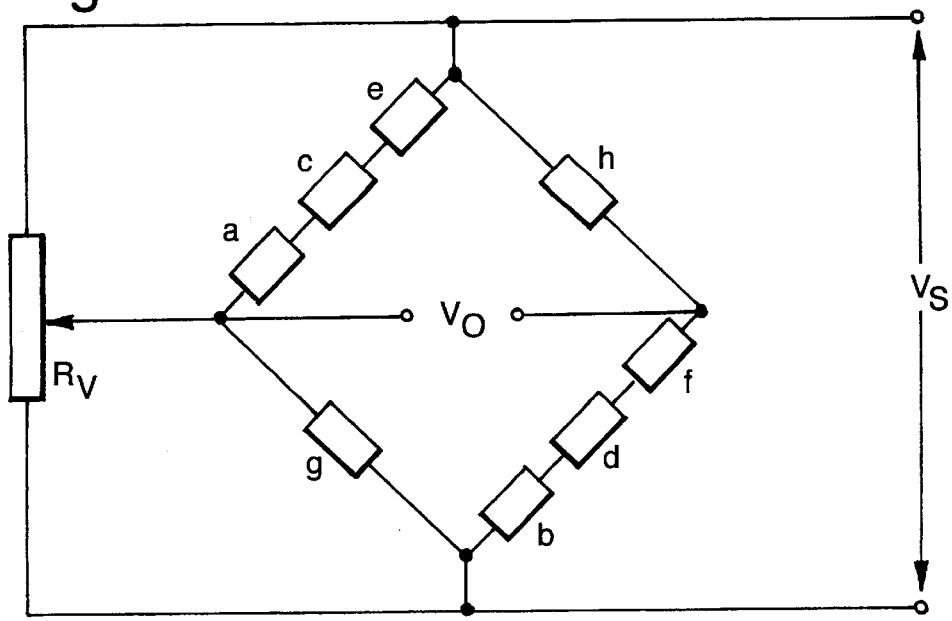
FIG. 12 is a schematic circuit diagram of a Wheatstone's bridge showing the interconnection of a compensating component.

A further embodiment of the invention is illustrated in FIG. 11. An area of the force sensing device's supporting substrate 110 which is covered by a cut away section of an overlaying force transmitting component 111 is used to locate a compensating component 109 such as a surface mount variable resistor for example. This component may then be used to trim the device for example by balancing a Wheatstone's bridge by interconnecting the component with force sensitive resistors 113, 114 and fixed resistors 115 in the manner illustrated by the circuit diagram shown in FIG. 12, for example, where component $R_V$ indicates an adjustable compensating component 109. In this way individual force sensors may be adjusted using such a compensating component to optimize their operating characteristics.

Some preferred embodiments of this invention have been described as being shaped as washers although other shapes may be used. Indeed for certain applications the use of other shapes will be mandatory both for the supporting substrate of the force sensitive devices and for the force transmitting component. Similarly any cut-away sections of the force transmitting component can be implemented as circles, chords or indeed any other suitable shape.

What is claimed is:

1. A force sensing transducer comprising:
   an electrically insulative support substrate,
   a force sensitive resistance having a resistivity which varies with applied force, comprising a thick film resistor formed as a plurality of overlapped layers of thick film material printed and fired onto the support substrate,
   a reference resistance located on the support substrate, and
   a force transmitting member overlying the force sensitive resistance and including a cut away portion in registry with the reference resistance preventing a force is transmitted to the force that sensitive resistance from also being transmitted to the reference resistance,
   whereby the change in resistance of the force sensitive resistance relative to the reference resistance is indicative of a magnitude of a force applied between the support substrate and the force transmitting member.

2. A transducer according to claim 1, wherein the support substrate is a metal washer with an electrically insulative surface layer formed by deposition and wherein the force sensitive resistance and the reference resistance are formed on the electrically insulative surface layer.

3. A transducer according to claim 1, including a plurality of discretely formed force sensitive resistances that are electrically connected in series.

4. A transducer according to claim 1, including:
   a plurality of force sensitive resistances mounted on the same support substrate and further including summing and averaging means arranged to measure the respective changes in resistance values of the force sensitive resistances and to produce a value indicative of the summed average of the changes in resistance which represents the total magnitude of force applied between the support substrate and the force transmitting member.

5. A transducer according to claim 1 wherein:
   the force sensitive resistance is fabricated to have a geometric outline which does not have sharp changes whereby localised stress concentrations are minimized.

6. A transducer according to claim 1, including a second insulative surface layer which is deposited over the force sensitive resistance to electrically insulate the force sensitive resistance from the force transmitting member.

7. A transducer according to claim 1, wherein the force transmitting member is glued or otherwise fixed to the force sensitive resistance.

8. A transducer according to claim 1, wherein compensating means is mounted on the transducer and is electrically interconnected with the force sensitive resistance to permit trimming of the transducer.

9. A transducer according to claim 1, wherein the force transmitting member is shaped to permit electrical connections to be made to the force sensitive resistance and reference resistance in areas that are not in use, subjected to any applied force.

10. A transducer according to claim 1, wherein the reference resistance is fabricated as a thick film resistor.

11. Force sensing apparatus comprising:
   an electrically insulative support substrate;
   a force sensitive resistance having a resistivity which varies with applied force, comprising a thick film resistor formed as a plurality of overlapped layers of thick film material printed and fired onto the support substrate;
   a reference resistance located on the support substrate;
   a force transmitting member overlying the force sensitive resistance and including a cut away portion in registry with the reference resistance preventing a force is transmitted to the force that sensitive resistance from also being transmitted to the reference resistance; and
   comparison means coupled to the reference resistance and the force sensitive resistance and operable to compare the relative resistance values of the force sensitive and reference resistance to derive a value indicative of a force applied between the support substrate and the force transmitting member.

12. Apparatus according to claim 11, wherein the comparison means includes a Wheatstones's bridge circuit.

* * * * *

UNITED STATES PATENT AND TRADEMARK OFFICE
CERTIFICATE OF CORRECTION

PATENT NO.   : 6,378,384 B1
DATED        : April 30, 2002
INVENTOR(S)  : Atkinson et al.

It is certified that error appears in the above-identified patent and that said Letters Patent is hereby corrected as shown below:

Column 4,
Line 30, Equation 2 has been corrected so that it reads as follows:

$$\frac{\partial V_o}{V_s} = \frac{\partial R}{R_L + \frac{R^2}{R_L} + 2R} \qquad \{\text{Equation 2}\}$$

Line 40, the expression has been corrected so that it reads as follows:

$$x = \frac{R_L}{R},$$

Line 45, Equation 3 has been corrected so that it reads as follows:

$$\frac{\partial V_o}{V_s} = \frac{\partial R}{R} \times \frac{1}{x + \frac{1}{x} + 2} \qquad \{\text{Equation 3}\}$$

Line 52, Equation 4 has been corrected so that it reads as follows:

$$f(x) = x + \frac{1}{x} + 2 \qquad \{\text{Equation 4}\}$$

Line 62, Equation 5 has been corrected so that it reads as follows:

$$1 - \frac{1}{x^2} = 0 \qquad \{\text{Equation 5}\}$$

Column 5,
Line 2, the expression has been corrected so that it reads as follows:

$$\frac{2}{x^3}$$

UNITED STATES PATENT AND TRADEMARK OFFICE
CERTIFICATE OF CORRECTION

PATENT NO.    : 6,378,384 B1
DATED         : April 30, 2002
INVENTOR(S)   : Atkinson et al.

It is certified that error appears in the above-identified patent and that said Letters Patent is hereby corrected as shown below:

Column 5, cont'd,
Line 12, Equation 6 has been corrected so that it reads as follows:

$$\frac{\partial V_o}{V_s} = \frac{\partial R}{4R} \qquad \{\text{Equation 6}\}$$

Column 8,
Line 35, after "a force" please add -- that --
Line 36, after "the force" please delete "that"

Column 10,
Line 4, after "force" please add -- that --
Line 5, after "force" please delete "that"

Signed and Sealed this

Twenty-second Day of July, 2003

JAMES E. ROGAN
*Director of the United States Patent and Trademark Office*